(12) United States Patent
Raveis, Jr.

(10) Patent No.: US 6,321,202 B1
(45) Date of Patent: Nov. 20, 2001

(54) SYSTEM AND METHOD FOR MANAGING TRANSACTIONS RELATING TO REAL ESTATE

(75) Inventor: William M. Raveis, Jr., Fairfield, CT (US)

(73) Assignee: Home Link Services, Inc., Shelton, CT (US)

(*) Notice: Subject to any disclaimer, the term of this patent is extended or adjusted under 35 U.S.C. 154(b) by 0 days.

(21) Appl. No.: 09/459,234

(22) Filed: Dec. 10, 1999

(51) Int. Cl.[7] ............................................. G06F 17/60
(52) U.S. Cl. ........................................... 705/1; 705/8
(58) Field of Search ............................. 705/1, 8, 9

(56) References Cited

U.S. PATENT DOCUMENTS

| | | | |
|---|---|---|---|
| 5,032,989 | * 7/1991 | Tornetta | 705/1 |
| 5,309,355 | 5/1994 | Lockwood . | |
| 5,324,922 | * 6/1994 | Roberts | 235/275 |
| 5,500,793 | 3/1996 | Deming, Jr. et al. . | |
| 5,584,025 | 12/1996 | Keithley et al. . | |
| 5,615,268 | 3/1997 | Bisbee et al. . | |
| 5,664,115 | 9/1997 | Fraser . | |
| 5,680,305 | 10/1997 | Apgar, IV . | |
| 5,689,705 | * 11/1997 | Fino et al. | 395/617 |
| 5,748,738 | 5/1998 | Bisbee et al. . | |
| 5,794,216 | * 8/1998 | Brown | 705/27 |
| 6,049,781 | * 4/2000 | Forrest | 705/30 |

FOREIGN PATENT DOCUMENTS

2352307-A * 1/2001 (GB) .

OTHER PUBLICATIONS

Real Estate Principles and Practices, 7th edition, by Alfred A. Ring, pp 314, 1972.*

Starting Out—The complete home buyer's guide, by Dian Hymer, pps 37, 138, 139, 212, 1998.*

Engler, Natalie, "Online Opportunity", Jan. 11, 1999, Informationweek, issue #716, p. 89.*

Jay Romano, "These Days, You Can Call It Real E–state", The New York Times, Mar. 12, 2000, Section 11, pp. 1 and 6.

"A Dot–Com Lineup of Online Sites," The New York Times, Mar. 12, 2000, Section 11, p. 6.

Print–out of Web Site www.move.com, pp. 1 and 2 of 2, print–out dated Feb. 24, 2000.

* cited by examiner

Primary Examiner—Eric W. Stamber
Assistant Examiner—Jeffrey D. Carlson
(74) Attorney, Agent, or Firm—Cummings & Lockwood

(57) ABSTRACT

A system and method for managing real estate transactions is provided. The method includes the steps of receiving and storing data relating to a plurality of contacts including buyers and sellers of real estate, receiving and storing data relating to a plurality of vendors each associated with at least one phase of a real estate transaction, accessing vendor data based upon occurrence of a particular phase of the real estate transaction and communicating data relating to the vendors to a contact upon occurrence of the particular phase of the real estate transaction. The system includes means for conducting each of these steps.

47 Claims, 14 Drawing Sheets

FIG. 3A

| 151 | 152 | 153 | 154 | 155 | 156 | 157 | 158 | 159 |
|---|---|---|---|---|---|---|---|---|
| EnteredBy | EntryDate | ChangedBy | ChangedDate | Spouse | SpouseEmployer | LogonName | State | StreetNumber |
| BHart | 7/23/99 | | | Jeanne | Cendant | Bill | CT | 213 |
| BHart | 4/16/98 | JSimmons | 1/31/99 | Edith | C&L | Harry | CT | 381 |
| BHart | 3/22/99 | | | Terry | Connecticut | Todd | CT | 443 |

FIG. 3B

| 160 | 161 | 162 | 163 | 164 | 165 | 166 | 167 | 168 |
|---|---|---|---|---|---|---|---|---|
| Suffix | Zip | Showing Instructions | MiddleName | LeadSourceCd | Prefix | LastName | HoldFlag | Salutation |
| | 06840 | Do not let cat out. | Nicholas | HJK | Mr. | Havas | Y | |
| | 06902 | | Xobiak | HJK | Mr. | Becher | | |
| | 06904 | | Thomas | HJK | Mr. | Kline | | |

| SendMarketInfoFlag | FirstName | Employer | City | Address3 | Comments | ActiveFlag | Address2 |
|---|---|---|---|---|---|---|---|
| N | Joseph | PBI | Westport | | | | |
| N | Fred | AT&T | New Canaan | | Do not call after 6 | | |
| N | Alan | Self | Stamford | | | | |

FIG. 3C

| Address1 | AgentID |
|---|---|
| | 667 |
| | 246 |
| | 121 |

| Changedby | EntryDate | ChangedDate | EnteredBy | City | Zip | Address1 |
|---|---|---|---|---|---|---|
| | 7/23/99 | | BHart | Stamford | 06902 | 139 Merida Street |
| JSimmons | 4/16/98 | 1/31/99 | BHart | Wilton | 06879 | 379 Page Boulevard |
| | 3/22/99 | | BHart | Norwalk | 06830 | 301 Carew Street |

| PreferredCommunicationsCd | VendorNumber | Address2 | State | StatusCd | Name | SignVendorID |
|---|---|---|---|---|---|---|
| Tel | 787 | 45 Elm Street | CT | active | Carved Signs | SV328 |
| Tel | 413 | 566 Boutin Avenue | CT | active | Express Signs | SV482 |
| ema | 276 | 354 Union Street | MA | active | Nigro Bros | SV947 |

| 351 | 352 | 353 | 354 | 355 | 356 |
|---|---|---|---|---|---|
| Changedby | ChangedDate | EnteredBy | EntryDate | ListingCommission | ListingCommissionTypeCD |
| JSimmons | 3/15/99 | BHart | 2/27/99 | LG | F |
| | | BHart | 1/31/99 | ;G | P |
| | | BHart | 8/11/99 | SP | F |

FIG. 8A

| 357 | | 359 | 360 | 361 | 362 |
|---|---|---|---|---|---|
| SellingCommission | TotalCommission | OriginalListPrice | OriginalListDate | CurrentListPrice | |
| F345 | 16,000 | 332,000 | 3/19/99 | 332,000 |
| P763 | 45,000 | 775,000 | 5/3/99 | 775,000 |
| F337 | 115,000 | 1,325,000 | 4/16/00 | 1,325,000 |

| PrimaryMLSID | LockBoxInstructions | SaleID | MLSStatus | Opportunity | ListingID | RenewalListTerm |
|---|---|---|---|---|---|---|
| LOCS | Leave porch lights on. | Na | Sold | | | 6 mos |
| LOCS | | | Active | | | 6 mos |
| LOCS | | 435cr | Active | | | 6 mos |

FIG. 8D

| RenewalDate | ReloClientID | RelocatingTo | OfficeID | City | PropertyType | SpecialInstructions |
|---|---|---|---|---|---|---|
| 1/1/00 | TT927 | ME | CT333 | Fairfield | Res | |
| 1/1/00 | | NH | CT287 | Providence | Res | |
| 1/1/00 | | | CT144 | Chappiqua | Res | |

FIG. 8E

| SpecialDivisionCD | SignVendorID | LeadSourceCD | ShowingInstructions | MarketingProgramCd |
|---|---|---|---|---|
|  | SV328 | LSC387 |  | CH376 |
| RIRE | SV482 | LSF336 |  | CH286 |
|  | SV947 | LSR332 | Don't let cat out | OC643 |

| OriginalListTerm | SignInstructions | SubDivisionName | InternationalPropFlag | State | FormTypeCd |
|---|---|---|---|---|---|
| 6 mos | GWH | Sleepy Hollow | N | CT | LF3 |
| 6 mos | ST | Grassy Knoll | N | RI | SF8 |
| 6 mos | ST | Union Square | N | NY | LF1 |

382 / 383 / 384 / 385 / 386 / 387

| HomeLinkNumber | Address2 | Address1 | TypeCd | StatusCd | ExpirationDate |
|---|---|---|---|---|---|
| 48265 | | 45 Oak St | f4589 | Act | 1/1/00 |
| 45985 | | 103 Elm St | f4589 | Act | 1/1/00 |
| 75842 | | 877 Main St | p6854 | act | 1/1/00 |

FIG. 8G

| Directions | FileIdentifier | Zip | Comments |
|---|---|---|---|
| Exit 12 off interstate, turn left at first light, take next right, third house on left. | FI358 | 06840 | Point out eastern view. |
| From town center, take Main Street south, turn right on street, house .75 mile down on right. | EG357 | 06386 | |
| Take south bridge into town, take third left onto Wispy Rd then a right onto Street and house is last one on the left | DK578 | 08476 | Discuss excellent schools. |

Microsoft Visual FoxPro

CallCenter  Tables  Data Entry  Administrator  Manager Forms  MailMerge  Exit — 960

Processing Service - vanlines

970 — REMEMBER, CUSTOMER SERVICE IS EVERYTHING!
CROSS SELL: REAL ESTATE SERVICES - MORTGAGE - VAN LINES - TRUCK RENTAL -
HOME INSPECTION INSURANCE -
ALWAYS SCHEDULE A FOLLOW-UP CALL! SMILE!!!!!!

Needs Analysis

Placement Information

980 — Wiliam Ravels Affinity Group
Al Tested (Al)
123 Main Street
Shelton, CT 06484

910 —
Type [Cape ▼]  Community [ ]   Age [ ]
Style [Antique ▼]                 Beds [3]
Lot Size [1 Acre ▼]               Baths [2]
Sq Ft [2000-2500 ▼]    Total Rooms [08]

920 —
☐ Kitchen      ☐ Family Room   ☐ Garage
☐ Dining Room  ☐ Den/Office    ☐ Fire Place
☐ Living Room  ☐ Basement ☐ Info Only  ☐ Not Interested

[Call List] [Customer][Help][Calendar][Calculator][Clients][Vendors][Tasks][Notes][Reprint][Exit]  [Exit]

Start/Stop Call                            990 —            Start/Stop Call

SYSTEM AND METHOD FOR MANAGING TRANSACTIONS RELATING TO REAL ESTATE

BACKGROUND OF THE INVENTION

1. Field of the Invention

The subject invention relates to managing real estate transactions, and more particularly, to a system and method for gathering, processing, disseminating and controlling information relating to real estate transactions.

2. Background of the Related Art

The traditional business model for real estate companies has been to list and sell properties with a sales force of independent contractors. Real estate companies have exclusively provided real estate agents, tours of properties on the market, submission of bids and information about schools and neighborhoods. Real estate agents have been the main interface for customers, who are the most vital assets of a real estate company.

Organizations such as a Multiple Listing Service (hereinafter "MLS") developed to aid the flow of information to customers. A MLS normally prepares books, which serve as references for real estate agents. The MLS books contain photos and descriptions of property for sale (hereinafter "listings"). Unfortunately, the MLS publications become outdated and are often difficult and costly to distribute. The present invention provides an improved system and method for disseminating information to customers, sales agents and real estate companies.

Real estate companies and sales agents have traditionally relied solely on commissions generated from listing sales. However, typical customers seek goods and services as a result of transactions in which they are involved. Providers of real estate related goods and services would desire the opportunity to have direct access to these customers in a timely manner. Consequently, a need exists for real estate companies to implement a method which links providers of such goods and services with customers to fully realize the potential revenue associated with their customer base as well as add value for their customers.

Despite their success, current business models for real estate companies have several additional shortcomings. For example, the sales agent controls the customer information. When sales agents try to extract value from the customer data, the time and effort they spend selling homes is diminished. Furthermore, the task of acquiring new customers, keeping existing customers satisfied and controlling customer information becomes a burden for sales agents. Often times, referrals are lost and appointments missed, because information has not been properly recorded.

Another problem arises when sales agents freely release customer data to electronic commerce businesses who profit therefrom. Alternatively, if the sales agent distributes customer data at a price, several additional problems may arise. First, customers have an expectation of privacy with respect to their personal information. Therefore, the customer data should not be distributed without permission. Second, the customers receive a multitude of cold calls from vendors. As a result, the customer develops an aversion to the process. Thus, there is a need for a system in which a sales agent can delegate tasks, such as information management and still maintain control over customer data in order to provide a monetary return to the real estate company.

Large investments in training and technology are necessary to enable sales agents to control the flow of information. Despite such large investments, no guarantee exists that the information will be managed better, value will be added for the customer or new revenue streams will be generated for the real estate company. Further, such efforts can fail due to a lack of support from sales agents and vendors of real estate related goods and services. Thus, the need exists for a method of managing real estate transactions which is highly endorsed and supported by sales agents as well as national and local vendors of real estate related goods and services. Furthermore, such investments are cost prohibitive for smaller organizations. Under these circumstances, a further need exists for a proven business model, which is accompanied by turnkey software that is easy to implement and yet affordably priced so that small size organizations can take advantage thereof. Moreover, the software would advantageously feature interoperability which allows the software to be enhanced by additional modules and integrated with current systems.

The proliferation of the Internet has presented an additional challenge to the traditional business model for selling real estate. The low overhead distribution of information via the Internet has created alternatives to the traditional real estate company. Customers are increasingly acquiring traditional real estate company services via the Internet without engaging a real estate company. As a result, the Internet has caused a downward pressure on broker commissions and increased competition for customers. Therefore, real estate companies require an improved method which adds value for their customers, generates new revenue streams and allows customers full access to information.

In view of the above deficiencies in the prior systems and methods for managing real estate transactions, there is a need in the art for an improved system and method for managing real estate transactions which gathers, processes and controls information in a more efficient and profitable manner.

SUMMARY OF THE INVENTION

The subject invention is directed to a system and method for managing real estate transactions. The method includes the steps of receiving and storing data relating to a plurality of contacts including buyers and sellers of real estate, receiving and storing data relating to a plurality of vendors of real estate related goods and services, wherein each vendor is associated with at least one phase of a real estate transaction, accessing vendor data based upon an occurrence of a particular phase of the real estate transaction and communicating data relating to the vendors to a contact upon the occurrence of a particular phase of the real estate transaction.

In addition, the method further includes the steps of receiving and storing data relating to a plurality of sales agents, generating reports relating to the plurality of sales agents as well as receiving and storing data relating to listings. Preferably, the step of accessing vendor data can occur upon the signing of a listing agreement, the signing of a buyer agreement, the signing of a binder agreement and closing of a contract for real estate. Alternatively, the step of accessing vendor data can occur within predetermined time periods preceding and following a closing date. The method further includes the step of determining a commission based upon the communication of data relating to the vendors to a contact or upon a sale of a vendor service to the contact.

The method further includes the steps of assigning a move consultant to a contact upon the occurrence of a particular phase of the real estate transaction, accessing and communicating data relating to vendors by the move consultant, notifying the move consultant of the occurrence of a particular phase of the real estate transaction and transmitting data relating to listings to contacts when a contact requests such data.

In another preferred embodiment, the method includes the steps of receiving and storing data relating to a plurality of contacts including buyers and sellers of real estate, receiving and storing data relating to a plurality of vendors, wherein each vendor is associated with at least one phase of a real estate transaction, and assigning a move consultant to each contact to facilitate communication between the contact and at least one of the plurality of vendors upon occurrence of a particular phase of the real estate transaction.

The method also includes the steps of providing the move consultant with access to a database containing information relating to a plurality of contacts, providing the move consultant with access to a database containing information relating to a plurality of vendors and notifying the move consultant of the occurrence of a particular event in the real estate transaction cycle. Additionally, the method includes the steps of storing for each contact, data relating to goods and services provided to the contact, communicating reminders to the contact based upon the data relating to goods and services and issuing an access card with a code to each contact to permit each contact to obtain discounts on goods and services provided by the vendors.

The system for managing real estate transactions includes means for receiving and storing data relating to a plurality of contacts including buyers and sellers of real estate, means for receiving and storing data relating to a plurality of vendors each associated with at least one phase of a real estate transaction, means for accessing vendor data based upon occurrence of a particular phase of the real estate transaction and means for communicating data relating to the vendors to a contact upon occurrence of the particular phase of the real estate transaction.

Preferably, the system also includes means for determining a commission based upon a sale of a vendor service to a contact and means for generating reports based upon the determination of such commissions. The system also has means for receiving, storing and presenting text and graphics relating to real estate listings, means for transmitting the text and graphics to a contact when a contact requests the text and graphics via Internet communications. Additionally, the system has means for analyzing surveys received from contacts relating to performance of a real estate company and employees thereof during a real estate transaction. The system also has means for storing, for each contact, data relating to the goods and services provided to them, communicating reminders to the contact based upon the data relating to the goods and services, and issuing an access code to each contact to permit them to obtain discounts on goods and services provided by the vendors.

These and other unique features of the system and method disclosed herein will become more readily apparent from the following description and the accompanying drawings.

BRIEF DESCRIPTION OF THE DRAWINGS

So that those having ordinary skill in the art to which the disclosed system and method appertains will more readily understand how to make and use the same, reference may be had to the drawings wherein:

FIG. 3 illustrates Table 1, which depicts a contact database within the servers of FIG. 2;

FIG. 5 is an example of a World Wide Web page depicting a contact information video display in accordance with an embodiment of the present invention;

FIG. 6 illustrates Table 2, which depicts a vendor database within the servers of FIG. 2;

FIG. 7 is an example of a World Wide Web page depicting a vendor information video display in accordance with an embodiment of the present invention;

FIG. 8*a* and FIG. 8*b* illustrate Table 3 which depicts a listing database within the servers of FIG. 2;

FIG. 9 is an example of a World Wide Web page depicting a listing information video display in accordance with an embodiment of the present invention.

DETAILED DESCRIPTION OF THE PREFERRED EMBODIMENT

The present invention provides a novel system and method for managing real estate transactions. The system and method allows sales, management and administrative personnel of a real estate company to gather, process and control data relating to real estate transactions in an efficient cost effective manner. Additionally, the system and method provides buyers and sellers of real estate with convenient access to information relating to the real estate transactions in which they are involved.

In particular, the system coordinates purchases and sales of residential real estate. In accordance with a preferred embodiment of the system, each of a plurality of different users perform different functions within the system. For example, the sales agent, buyer and seller access information relating to real estate transactions stored in a database. Based upon the same information, administrative personnel of the real estate company maintain schedules and cross-sell products and services, while management personnel generate reports and evaluate the performance of agents.

Figure 1:
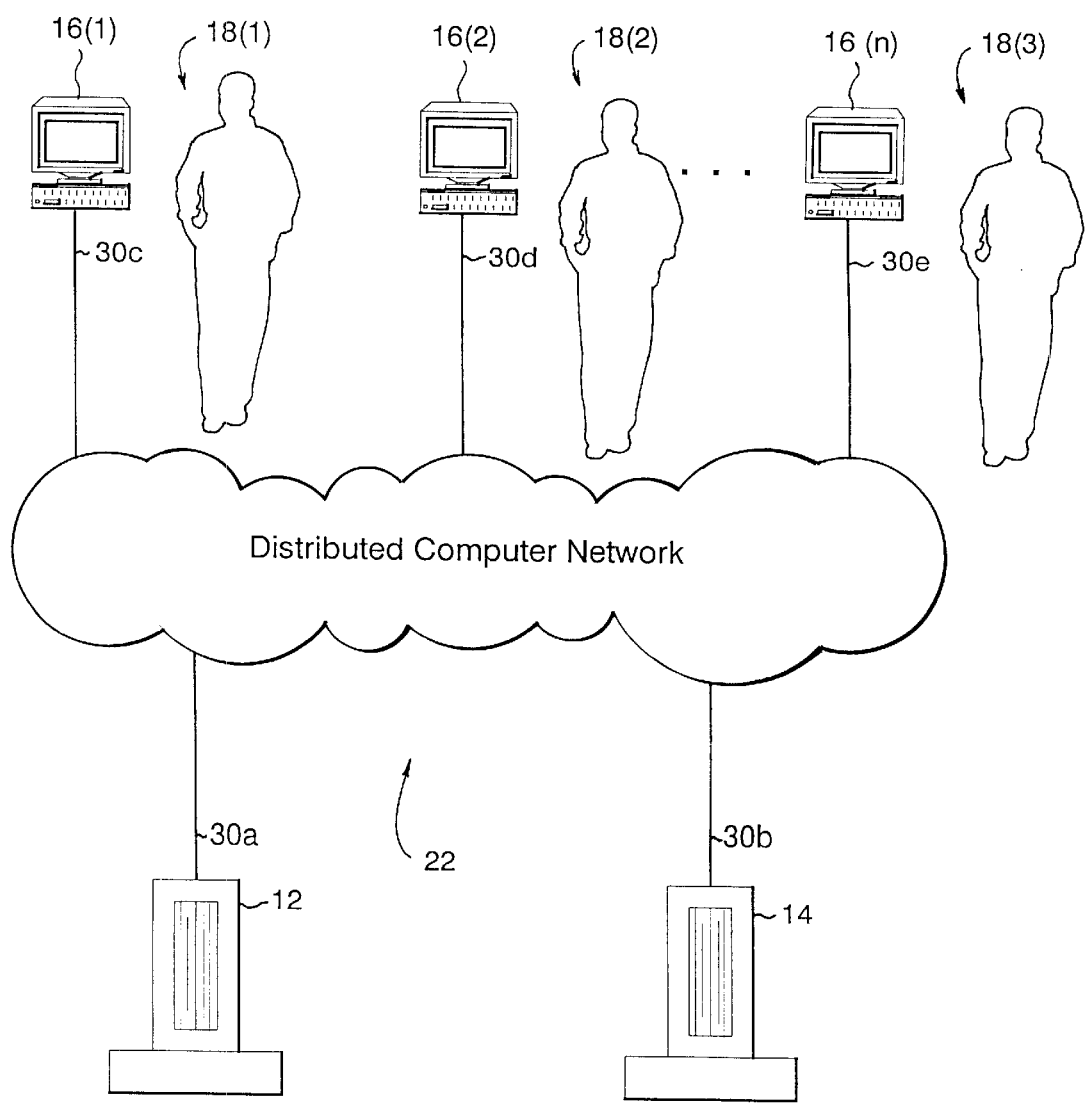
FIG. 1 is an overview of an environment in which an embodiment of the present invention may be used.

Referring to FIG. 1, there is illustrated a schematic representation of an environment 10 in which the system and method of the present invention may be implemented. The environment 10 includes servers 12 and 14 which communicate with a distributed computer network 22 via communication channels 30*a* and 30*b*, respectively. Servers 12 and 14 host multiple web sites and house multiple databases necessary for the proper operation of the system of the subject invention.

It is envisioned that the subject invention 10 may incorporate one server or multiple servers. Multiple servers can cooperate to facilitate greater performance and stability of the subject invention by distributing memory and processing as is well known. U.S. Pat. No. 5,953,012 to Venghte et al. describes a method and system for connecting to, browsing and accessing computer network resources and is herein incorporated by reference in its entirety. Similarly, U.S. Pat. No. 5,708,780 to Levergood et al. describes an Internet server which controls and monitors access to network servers and is also herein incorporated by reference in its entirety.

Distributed computer network 22 may include any number of network systems well known to those skilled in the art. For example, distributed computer network 22 may be a combination of local area networks (LAN), wide area networks (WAN), intranets or the Internet, as is well known. In the preferred embodiment, the computer network 22 is the Internet. The preferred method of accessing information on the Internet is the World Wide Web, because navigation is intuitive and does not require technical knowledge.

Computers 16(1)–16(n) are associated with users 18(1)–18(n), respectively. Users of the subject invention include vendors, contacts, sales agents and administrative personnel. Vendors provide goods and services related to real estate, such as, house painting, plumbing, electrical work, roofing and the like. Contacts, i.e. home sellers and/or buyers, generally hire vendors in the months leading up to and following the closing of a real estate transaction. The real estate company engages sales agents to manage the contacts. Administrative personnel may be any combination of a technical system analyst, a move consultant, a sales manager, accounting personnel and the like, who work directly or indirectly for a real estate company.

A plurality of users may share the same computer although for simplicity only one user per computer is illustrated. The plurality of users can utilize the system 10 simultaneously. The computers 16(1)–16(n) allow users to access information on the servers 12 and 14. The computers 16(1)–16(n) communicate with the distributed computing network 22 via communication channels 30c–30e, respectively. The communication channels 30a–30e, whether wired or wireless, are well known and therefore not further described herein.

In a preferred embodiment, the computers 16(1)–16(n) are desktop personal computers that support MICROSOFT INTERNET EXPLORER®04.0 (available from Microsoft Corporation, One Microsoft Way, Redmond, Wash. 98052-6399) and have a 56k modem, ISP or WAN connection. For example, the computers 16(1)–16(n) preferably consist of a PENTIUM® processor (available from Intel Corporation, 2200 Mission College Boulevard, Santa Clara, Calif. 95052), 64 MB RAM, a 56k modem, a WINDOWS® 95 operating system (available from Microsoft Corporation, One Microsoft Way, Redmond, Wash. 98052-6399) and a video monitor with 16 bit color and 800×600 pixels, as is well known and therefore not depicted in detail.

Figures 2A, 2B:
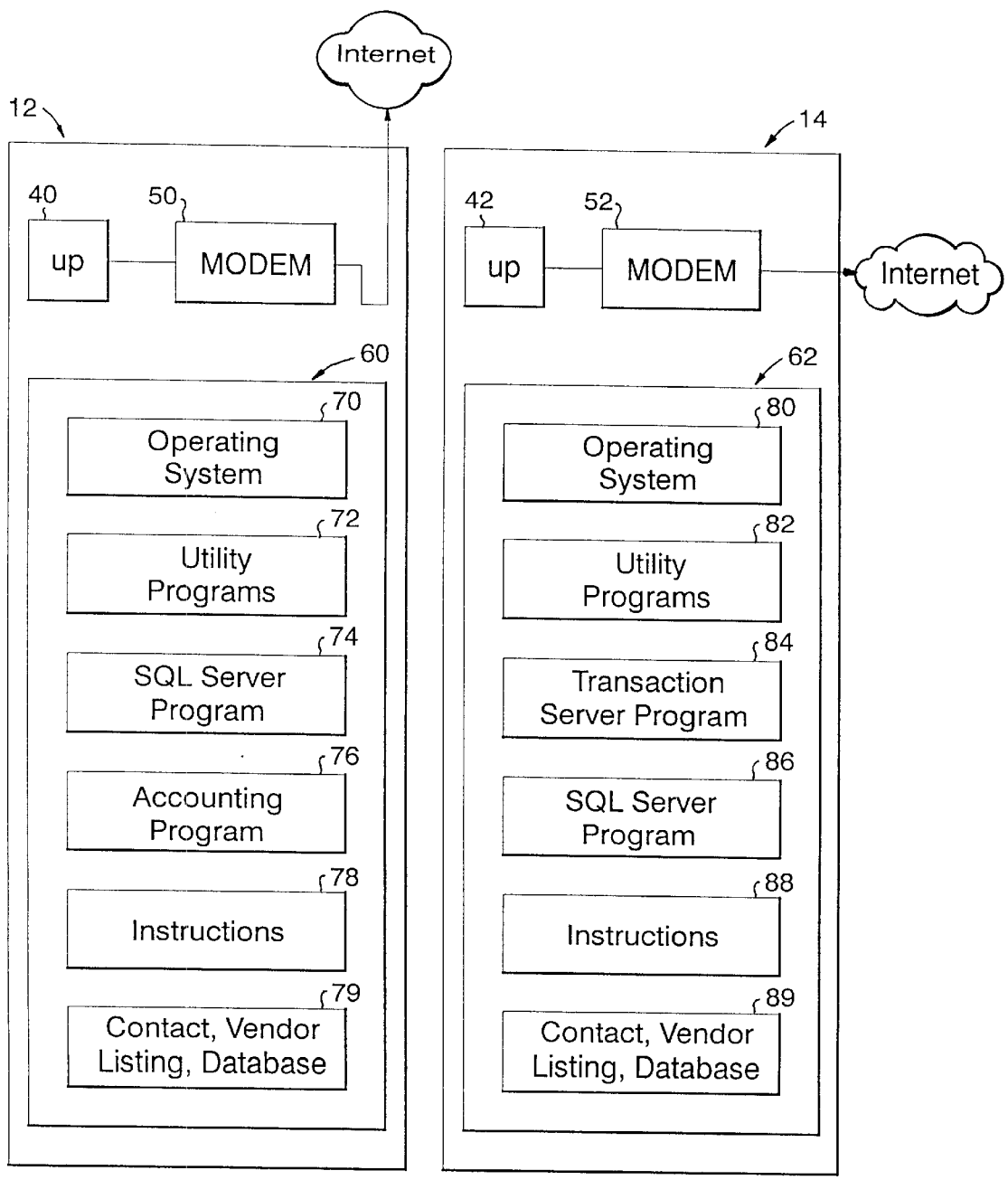
FIG. 2 is a diagrammatic representation of embodiments of servers within the subject invention.

Referring now to FIG. 2, there is illustrated a diagrammatic representation of embodiments of servers 12 and 14 in connection with the present invention. In a preferred embodiment, multiple servers 12 and 14 share similar architecture. Exemplary servers 12 and 14 include memory 60 and 62, respectively, for storing resources which are accessed by users over the Internet. Resources include any software, data, files, documents, web pages and other data necessary to practice the subject invention. At least one processor 40 and 42 are in communication with memory 60 and 62, respectively. Modems 50 and 52 are also in communication with processors 40 and 42, respectively, in order to facilitate interaction with users via the Internet, as is well known to those skilled in the art. In a preferred embodiment, the architecture of servers 12 and 14 consists of a PENTIUM® PRO 2000 processor (available from Intel Corporation, 2200 Mission College Boulevard, Santa Clara, Calif. 95052), 128 MB RAM and hard disk non-volatile memory large enough to support web files, an operating system, several applications and several databases.

With continuing reference to FIG. 2, operating systems 70 and 80, as well as utility programs 72 and 82, are stored on servers 12 and 14, respectively. The operating systems 70 and 80 and utility programs 72 and 82 are used by the system developers to develop and implement the subject invention. In the preferred embodiment, WINDOWS NT® software (available from Microsoft Corporation, One Microsoft Way, Redmond, Wash. 98052-6399) is the server operating system. It is envisioned that the websites are created in HTML language utilizing VISUAL STUDIOS® software version 6.0 (available from Microsoft Corporation, One Microsoft Way, Redmond, Wash. 98052-6399) and remote access is facilitated by Mabry's FTP/X Control. TRANSACTION SERVERS® software (available from Microsoft Corporation, One Microsoft Way, Redmond, Wash. 98052-6399) allows developers to deploy server applications to facilitate the necessary transactions. MICROSOFT SQL SERVER® software version 6.5 (available from Microsoft Corporation, One Microsoft Way, Redmond, Wash. 98052-6399) is the database engine used by the Listing System. MICROSOFT INTERNET INFORMATION SERVERS® IIS software (available from Microsoft Corporation, One Microsoft Way, Redmond, Wash. 98052-6399) allows developers to customize the websites. ERWIN® software version 3.5 (available from Logic Works, Inc. at 214 Carnegie Center, suite 112, Princeton, N.J. 08540) maintains current entity relationship diagrams for the Listing System database. It is envisioned that SEAGATE's CRYSTAL REPORTS® software version 7.0 (available from Seagate Software, Inc. at 920 Disc Drive, Scotts Valley, Calif. 95066) is used to develop report templates. MICROSOFT WORDS® 97 software (available from Microsoft Corporation, One Microsoft Way, Redmond, Wash. 98052-6399) is used for developing some form contracts and OMNIFORM® software version 3.0 (available from Caere Corporation at 100 Cooper Court, Los Gatos, Calif. 95030) is used to develop line art intensive forms templates within the application.

In the preferred embodiment, server 12 houses a MICROSOFT SQL SERVERS® software version 6.5 (available from Microsoft Corporation, One Microsoft Way, Redmond, Wash. 98052-6399) and GREAT PLAINS ACCOUNTING® installations (available from Great Plaihs Software, Inc. at 1701 SW 38th Street, Fargo, N.Dak. 58103), as denoted generally by reference numerals 74 and 76, respectively. Server 14 houses MICROSOFT TRANSACTION SERVERS® software version 2.0 and MICROSOFT SQL SERVERS® IIS software version 4.0, as denoted generally by reference numerals 84 and 86, respectively. Servers 12 and 14 also store the execution code which is the instruction set necessary to implement the subject invention as denoted generally by reference numerals 78 and 88, respectively. It is noted that while the exemplary description herein refers to specific software, those skilled in the art will readily appreciate that substitutions may be made thereto without departing from the spirit and scope of the present invention.

In a preferred embodiment, memory 60 and 62 store a multiplicity of databases as denoted generally by reference numerals 79 and 89, respectively. It is envisioned that the databases are created utilizing MICROSOFT SQL SERVERS®, as is well known in the art. Databases 79 and 89 contain data relating to advertising, sales agents, contacts, listings, vendors, and the real estate company. In another embodiment, a third server can be provided for storing databases in order to provide enhanced performance and stability.

It is envisioned that advertising databases relate to advertising copy, advertising companies, advertising placements and advertising requests by contacts and sales agents databases relate to sales agents, agent financial information, appointments, agent goals, goal weighting, agent MLS codes and agent phone numbers. Databases for contacts preferably consist of tables relating to contacts, contact mailings, contact referrals and contact types. Listing databases preferably relate to listings, listing agent, listing MLS, lock boxes, MLS, MLS data, open house requests, picture references, garages, new home referral fees and showing information. Vendor databases preferably relate to relocation companies, relocation fee percentages, relocation company phone numbers, signs, sign vendors, mailings to vendors and the like. Real estate company databases preferably consist of attorneys, commission splits, company commissions, forms, types of mass activities, report tables, sale transactions, sales agents, sale commissions, sale contact, security, sellers attorney, offices, office commission fees, office MLS, office phone, regions, region commissions, surveys, survey choices, survey questions, survey response, system identifiers, system tables, trustee tracking, user messages, user roles and user sessions.

The databases are used in a relational arrangement, as is known in the art, so that they relate to one another by way of fields that store common data. It is noted that while the exemplary description herein refers to specific individual databases, formats, records and fields, those skilled in the art will readily appreciate that various modifications and substitutions may be made thereto without departing from the spirit and scope of the present invention.

Referring to FIG. 3, Table 1 depicts an exemplary contact database 100 stored within one of servers 12 and 14. In particular, Table 1 depicts a preferred embodiment of a record schema for a contact database in detail. The contact database includes a record for each contact, wherein each record contains a plurality of fields for receiving information associated with each contact.

In accordance with an embodiment of the present invention, the fields of each contact record include, inter alia, fields 151–154 which contain identifying information relating to entry of the data. For example, the name of the real estate employee who originally entered the data, a date upon which it was entered, the name of the employee who may have modified the record and when the modification occurred. Fields 155–180 contain data relating to the contact, such as, for example, data relating to the spouse of the contact, the employer of the spouse and contact, the contact logon name, address associated with the contact, showing instructions which contain the details of how to properly tour potential buyers through the contact's listing, the contact name, a flag indicating when to indicate whether or not an appropriate mailing has occurred and a sales agent associated with the contact.

In a preferred embodiment, for security, access to modifying the contact database 100 is restricted to the sales agent associated with the contact, the area and sales managers and system administrators. The sales agent can determine how to access the listing in order to schedule a showing, how to communicate with the contact and whether or not marketing information needs to be sent to the contact by accessing the contact database 100. Authorized users can add and delete contacts, search for a contact record, browse contact transactions, monitor contact activity and transfer ownership of that contact to another sales agent.

By way of example, sales agents have a user interface consisting of text and graphics, which allows them to manage their contacts, listings and sales. A forms management interface transfers basic information to a number of forms associated with a sale or listing, including MLS forms. A control mechanism allows sales agents to access a variety of "actions" associated with each listing and sale, such as advertising copy, requests and appointment information. An agent can view listings and monitor activity relating to their listings. For example, an email interface can notify a sign company when the listing agreement is signed and further notifies the listing agent when an appointment is taken for a listing to be shown. It is envisioned that access to the web sites of the subject invention is available wherever a user has access to the Internet. For example, a sales agent can be at home, in the office or at a remote location, and access the contact database.

Figure 4:
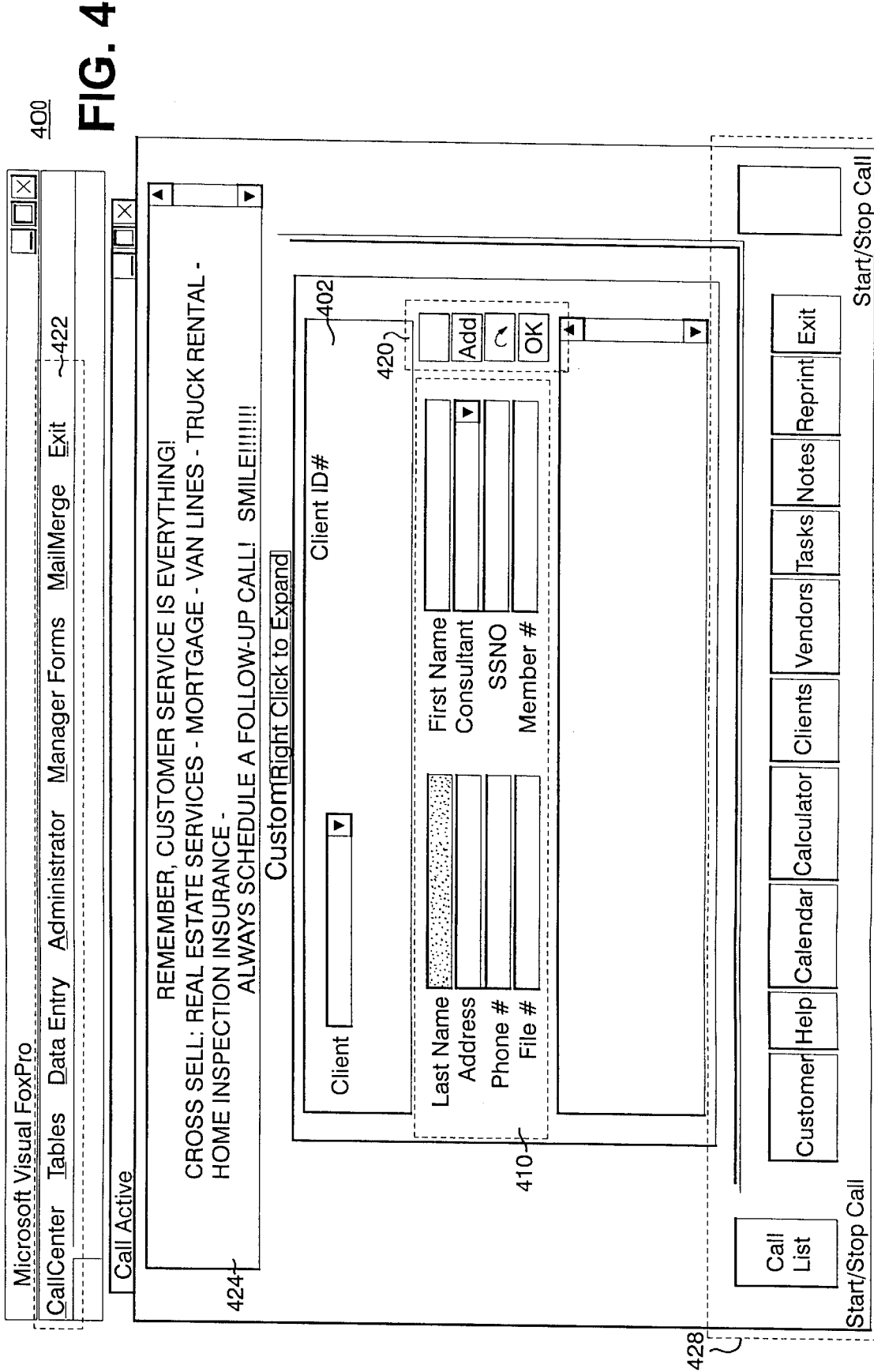
FIG. 4 is an example of a World Wide Web page depicting a contact search video display in accordance with an embodiment of the present invention.

Referring to FIG. 4, a World Wide Web page depicting a contact search video display is illustrated. It should be recognized that "video display" and "screen" will be used interchangeably throughout the specification. Servers 12 and 14 display the contact search screen, designated generally by reference numeral 400. Upper menu bar 422 can be selected to provide the user with several options such as disconnecting from the online connection. Area 424 contains a message of the day, selected by the real estate company. As shown in FIG. 4, the importance of cross selling products and service like insurance and van lines is emphasized by the message of the day. Further, a reminder to schedule follow up calls is also included within the message of the day.

A lower icon bar 428 presents several alternative methods for the user to select the same options that are available via upper menu bar 422. For example, the session can be terminated by the user selecting the stop call icon. Further, security is enforced by not allowing all functionality for all users. Functionality is also limited depending upon the data entered by the user. For example, the reprint icon, within lower menu bar 428, could not be selected by the user because no information has been entered. The unavailable status is conveyed to the user because the reprint icon is shaded gray instead of black, as is common and accepted as intuitive by those skilled in the art.

With continuing reference to FIG. 4, a sales agent or move consultant uses the subject invention to locate data relating to a contact. In the preferred embodiment, the data entered to locate contact data could be selected from any of the fields in area 410, which includes address field, phone number, file number, first name field, consultant field, social security number, member number, and area 402, which includes a client field with a pull down menu, as is common in the art. In accordance with a preferred embodiment, to initiate a search, a real estate company employee enters data into area 410, such as the last name of the contact in the last name field, and selects the binocular icon within area 420. During searching, the name fields of the records in the contact database are compared for a match. Once an entered contact name is matched within the contact database, the servers 12 and 14 display to the user the contact information screen 500, as described below with reference to FIG. 5.

Figure 5:
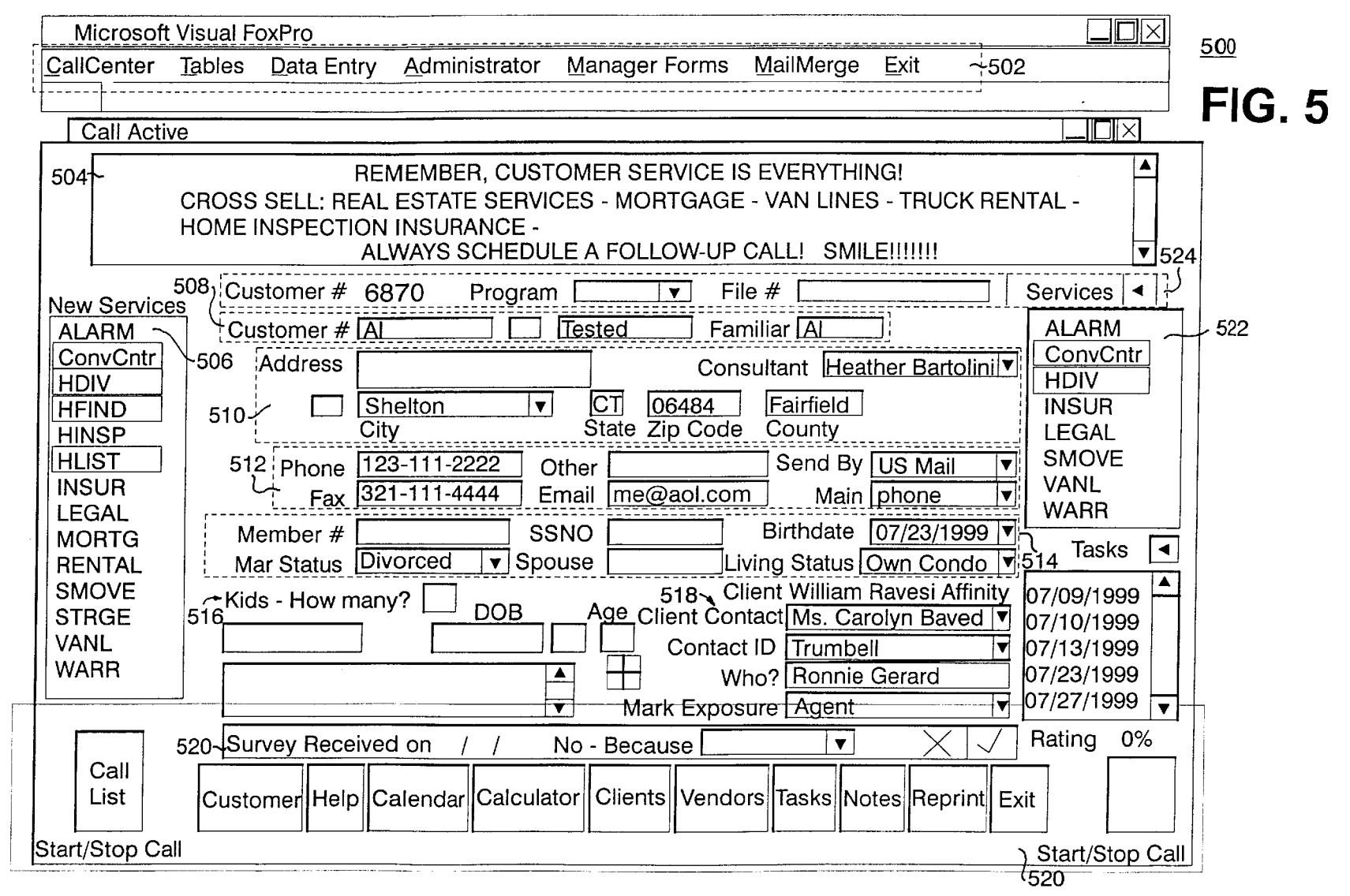

In accordance with a preferred embodiment, FIG. 5 illustrates a contact information screen, designated generally by reference numeral 500. The contact information screen 500 contains the data relating to a contact. At the contact information screen 500, editing capability and other options are available to authorized users from the upper menu bar 502 and lower menu bar 520, as described with reference to FIG. 4. The customer number, program and file number are displayed in area 524. In area 522, users can utilize further functionality by selecting icons. For example, the "ConvCntr" icon allows the user to schedule utility hook-ups and the like. The name and address of the contact are displayed in areas 508 and 510, respectively. For example, the name of the contact in FIG. 5 is Al Tested. The data relating to communicating with the contact is shown in area 512. Personal and progeny data are available in areas 514 and 516, respectively. The data relating to a referral, who may be entitled to share a commission related to a contact, is displayed in area 518. If a survey is relevant to the contact, data relating to the survey will be displayed in area 520.

Referring to FIG. 6, Table 2 depicts an exemplary record schema for a sign vendor database 600 in detail. It is envisioned that a database would be created for each type of vendor such as relocation companies, mortgage companies, painting companies and the like. By way of example, Table 2 illustrates a database for a sign vendor who provides a "for sale" sign at the listing for the real estate company. More particularly, the sign vendor database 600 includes a record for each vendor, wherein each record contains a plurality of fields for receiving information associated with each vendor.

In accordance with a preferred embodiment of the present invention, the fields of each record for a sign vendor database 200 include, inter alia, fields 251–254 containing data relating to how each record was populated with data. Fields 255–264 contain data relating to a sign vendor, such as, data relating to a sign vendor address, a preferred method of communication for the sign vendor, a numeric identifier for the sign vendor and a name of a person at the sign vendor.

It is envisioned that the vendor databases contain all the necessary information for move consultants, contacts and sales agents to utilize the vendor. For example, if a preferred mortgage company conducts itself on the Internet, the preferred mode of communication would indicate email and an email address would be included.

Figure 7:
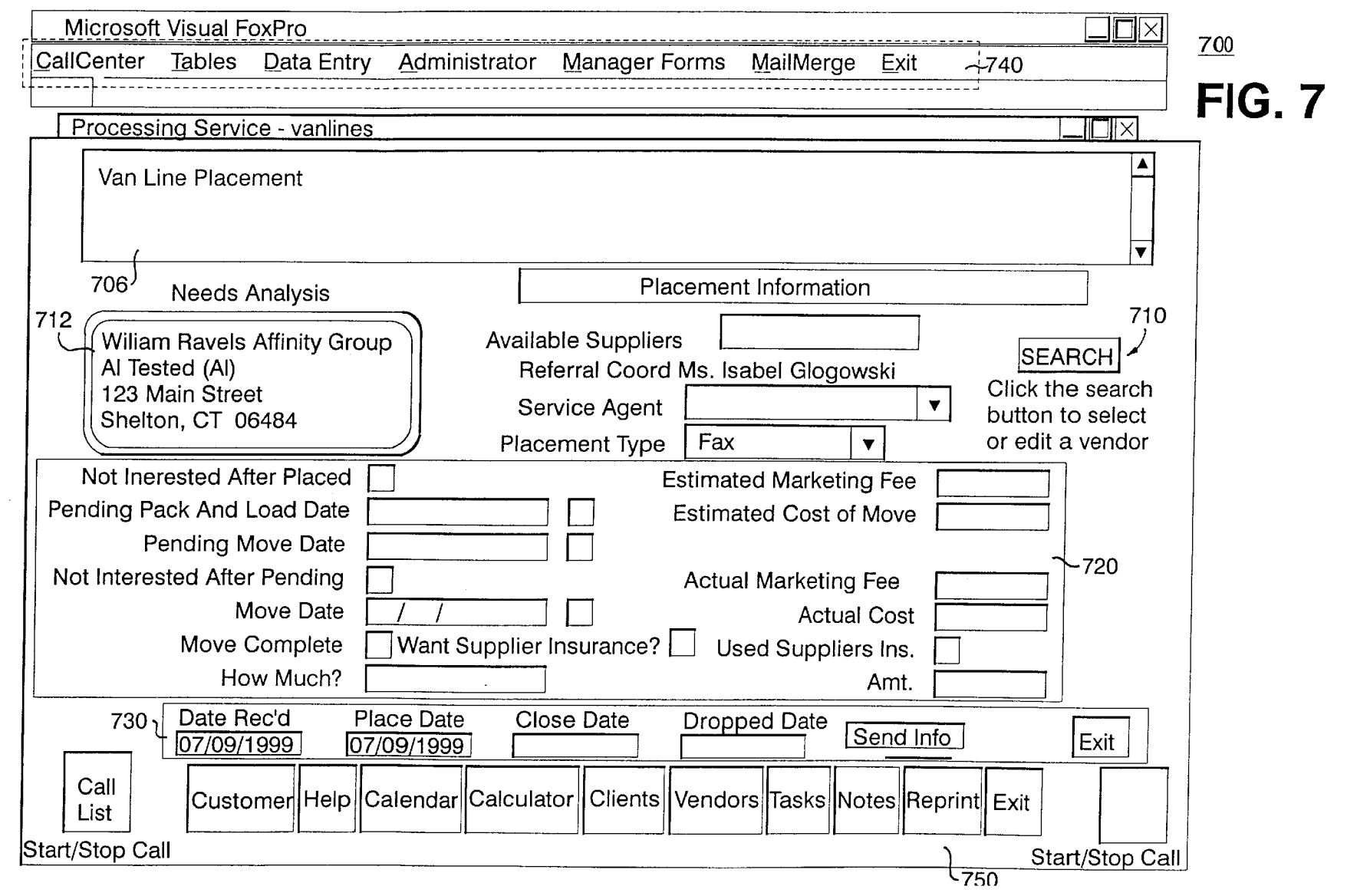

Referring now to FIG. 7, an exemplary van line placement screen is illustrated and denoted generally by reference numeral 700. The heading 706 indicates that the screen displayed to the user is a Van Line Placement screen. In the search area 710, a contact box 712 displays the contact information for which the search is being conducted. For example, an Available Suppliers field in area 710 receives a vendor name from the user. The Referral Coordinator is indicated underneath the Available Suppliers field, in this example the Referral Coordinator is "Ms. Isabel Glogowski". Additionally, fields related to Service Agent and Placement Type offer pull down menus as is well known to those skilled in the art. Lastly, in service area 710, a "search" button can be selected by the user to initiate selecting or editing a vendor.

Still referring to FIG. 7, quote area 720 includes fields related to a specific move associated with the contact. The information includes the loading and moving dates and notes whether or not the move has been completed. Cost information is also provided, such as total price, estimated and actual marketing fees as well as estimated and actual cost. Another field within area 720 receives and displays whether or not the vendor has insurance, for example a "Y" would indicate the vendor is insured. Calendar area 730 provides date related information. In a preferred embodiment, the date information provided in the calendar area 730 is the date an order is received, a place date indicating when services are to be provided, a closing date for the listing and a dropped date. Additionally, calendar area 730 depicts a "Send Info" button to allow the user to generate a mailing to the contact. The upper menu bar 740 and lower menu bar 750 function as described above with respect to FIG. 4.

Referring to FIG. 8a and FIG. 8b, Table 3 depicts another exemplary database stored within one of the servers 12 or 14. Namely, a record schema for a listing database, designated generally by reference numeral 300. A listing is a piece of real estate which has been offered for sale through a sales agent of the real estate company. The listing database 300 includes a record for each listing, wherein each record contains a plurality of fields for receiving information associated with each listing. The listing database 300 stores the data necessary to identify real estate offered for sale by the real estate company.

In accordance with an embodiment of the present invention, the fields of each listing record include, inter alia, fields 351–354 containing data relating to how each record was populated with data. Fields 355–359 contain data relating to commissions associated with the listing, such as, listing commission, data relating to the type of listing commission, selling commission, data relating to the type of selling commission and data relating to the total real estate company commission. Data relating to original list price, date of the listing and current list price is preferably contained in fields 360–362. The remaining fields in exemplary Table 3, namely fields 363–397 contain data relating to the listing. For example, the listing records further includes a MLS identifier for the listing, instructions for the lock box at the listing, a field indicating whether or not the contact associated with the listing is a relocation contact and a field indicating what type of property the listing is. Furthermore, fields in the listing record may contain data relating to a sign vendor associated with the listing, showing instructions and directions for the listing, a zip code for the listing and an open field to include any miscellaneous comments relating to the listing.

It is envisioned that the listing databases contain all the necessary information for move consultants, contacts and sales agents to manage the sale of the listing. For example, if an owner of a listing has an indoor cat which continually tries to go out of doors, the special instructions field as well as the showing instructions field could indicate that care needs to be taken not to allow the cat an opportunity to leave the house.

Referring now to FIG. 9, an example of a World Wide Web page depicts a listing video display, denoted generally by reference numeral 900. The listing area 910 provides data relevant to the listing. In a preferred embodiment, fields within the listing area 910 indicate the type of the listing, style of listing, lot size, square footage of the listing, age of the listing and number of bedrooms, bathrooms and total rooms. Pull down menus are associated with each of these fields, as is well known to those skilled in the art. Further, a check box area 920 is provided to further specify what types of rooms are included within the listing. The upper menu bar 960, message of the day area 970, contact box 980 and lower menu bar 990 function as described above.

Although specific examples have been illustrated in FIGS. 4, 5, 7, and 9, it will be appreciated by those skilled in the art that variations or modifications will achieve the desired results necessary to practice the subject invention and such is considered within the scope of the subject invention. Similarly, although the databases have been described with respect to specific records, the subject invention is not limited to such. Tables 1, 2 and 3 are provided as examples only. It is within the scope of the subject invention to vary the fields contained within the databases from those illustrated.

Figure 10:
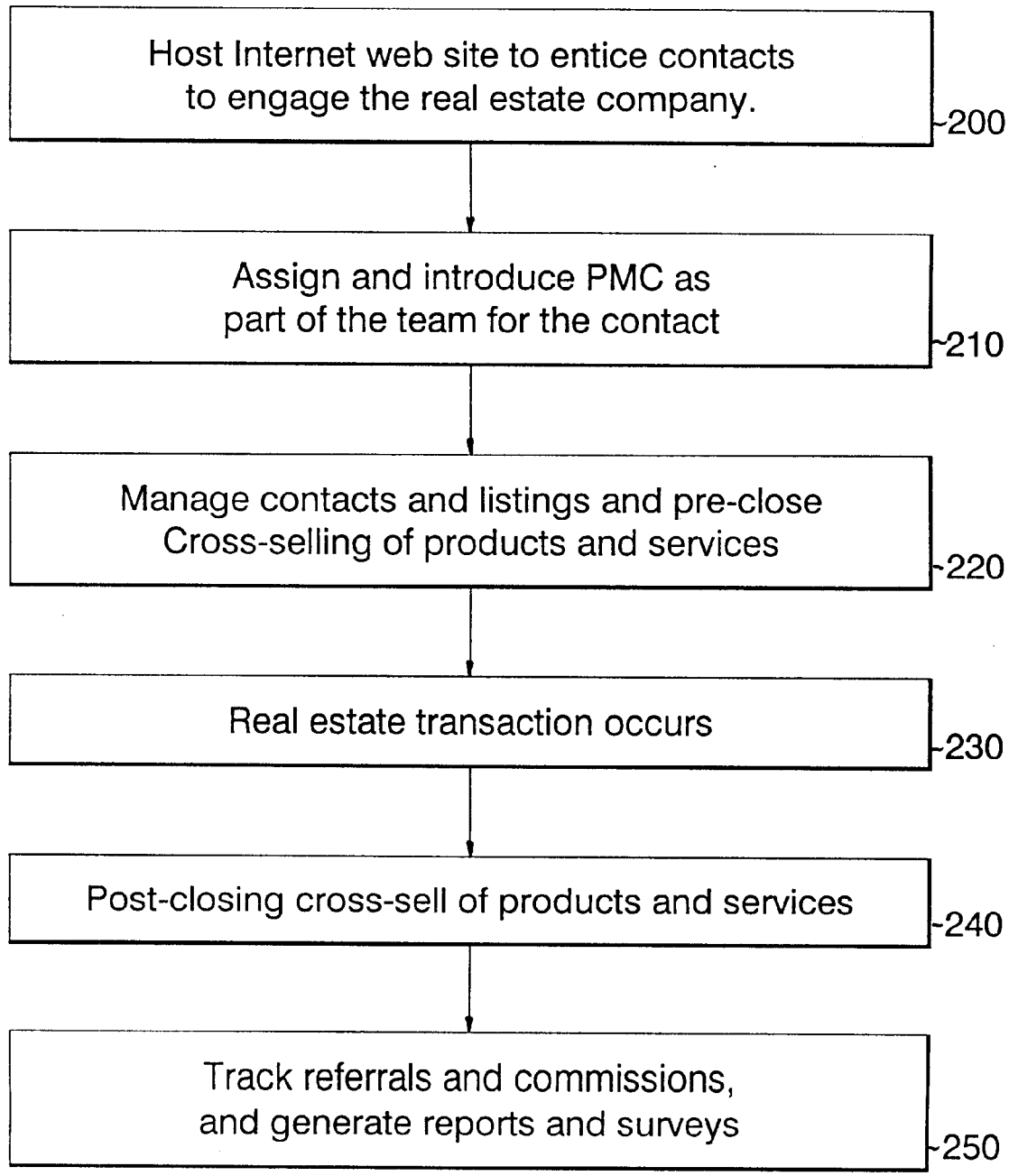
FIG. 10 is a flowchart depicting a process for managing real estate transactions in accordance with an embodiment of the present invention.

Referring now to FIG. 10, there is illustrated a flowchart depicting a process for managing real estate transactions in accordance with an embodiment of the present invention. At step 200, the real estate company hosts a web site to provide access to information via the Internet. In a preferred embodiment, the real estate company website provides users access to a real estate company profile, sales agent biographies, school information, neighborhood information, local tax rate information and the databases stored in servers 12 and 14. Further, the real estate company website may contain banner advertisements and links to related web sites. Preferably, the banner advertisements and links are associated with national and local vendors of real estate related goods and services.

It is envisioned that the system and method provides for administration and security maintenance, thus security Groups are defined. Therefore, although each user of the subject invention has access to a user interface, each group's access is controlled. The interface specifies which aspects of the program can be accessed, and at what level. Such limitations of functionality are well known to those skilled in the art and therefore not further described herein.

Still referring to step 200, when a contact decides to use the services of the real estate company, the contact signs an agreement with a real estate agent. A contact may be a potential buyer of real estate or an entity desiring to sell a particular piece of real estate. Therefore, the agreement may be a buyer agreement or an agreement that the contact will list their real estate through the real estate company, i.e. a listing agreement. Such agreements commence a first phase in the cycle of a real estate transaction.

Referring to FIG. 10, still at step 200, the data relating to the contact and listing are entered into the databases stored in servers 12 and 14 as soon as the data is available. Administrative personnel assign the applicable MLS number in the subject invention once the listing has been entered into a MLS. A select list of information fields are updated periodically via a MLS interface. For example, an online MLS may have pictures associated with a listing. If the curb appeal of the house has undergone improvements, a new picture can be incorporated. Therefore, the information on servers 12 and 14 is current without requiring reprinting. Additional pictures can be uploaded and displayed within the web browser. Users of the subject invention can access MLS and the other databases in a well known manner as described with respect to FIG. 4, as would be readily appreciated by those skilled in the art.

At step 210, a move consultant is assigned to the team involved with a client. It is envisioned that a move consultant can manage approximately 350 contacts simultaneously. A move consultant aids the sales agent and contact in every aspect of a real estate transaction. As a result, the sales agent only needs to be knowledgeable with respect to real estate, because a move consultant can address other issues such as scheduling showings, coordinating movers and van lines, providing utility connections and disconnections, referring carpet cleaners and installers, maintaining advertising copy, controlling lock box information, and processing data relating to signs, open houses, advertising requests and appointments for showings. As a result, the service provided by a move consultant is an important feature in the system and method of the subject invention.

In another embodiment, a plurality of move consultants may be located at a centralized national calling center. The national calling center would assist local real estate companies that do not require or cannot afford a full-time move consultant. Therefore, small organizations would be able to benefit from the subject invention.

In a preferred embodiment, the subject invention tracks all transactions that the contact is involved with, keeps a tally of direct mail sent to contacts and provides for a Web Logon ID which allows the contact to have access to the databases stored on servers 12 and 14. During a session on the Internet, a contact can check the status of their listing, select a link to a vendor, update a portion of their contact data, send an email to the associated agent or move consultant, view listings through the MLS interface and the like.

It is envisioned that data relating to contacts and listings will also include a history of all real estate related goods and services provided. Based upon the history, move consultants communicate future maintenance reminders to contacts. For example, a house may require the gutters to be cleaned every fall season. An entry in the history will indicate what vendor and when the cleaning was last performed. As the fall approaches again, a move consultant communicates a remainder to the contact indicating the gutter should be cleaned before winter, when it was last performed and a vendor who can provide the service. Thus, contacts are reminded of tasks in a timely and efficient manner and goods and services are effectively cross-sold by the move consultant.

At step 220, sales agents, a move consultant and real estate company management are allowed to track contact activity and generate reports on a continuing basis. The move consultant markets national and local vendor's services and products to contacts. An average buyer requires five to ten different services from the time an agent agreement is signed until closing. For example, a contact may have their house painted by a painter, a leaking faucet repaired by a plumber, shrubs planted by a landscaping company and hire a moving van, all in preparation for selling their home. In preparation for buying a home, a contact may acquire a mortgage, retain a lawyer to conduct a title search, enlist an inspector to perform a premise inspection and hire a moving van.

It is envisioned that contacts will prefer the system of the subject invention because the combination of the sales agent and move consultant is a single resource for addressing all their real estate related needs. Further, the increased buying power garnered by the real estate company can yield volume discounts which can be passed along to the contact.

In the preferred embodiment, a move consultant presents choices via tele-communications, which instills a feeling of control in the contact. It is envisioned that the communications to the client can also be automated via email, facsimile and the like, as is well known. As a result, no personal contact information is released without the contact granting permission because a move consultant presents the vendor information to the contact.

Vendors are motivated to participate in the system of the subject invention because timely access to contacts is provided thereby. The timely access results in a high sale conversion rate for vendors and reduces their marketing costs. Revenue is created for the real estate company by a fee paid for having a move consultant market their goods and services, and for allowing the vendor to advertise directly, such as, through banner advertisements on the real estate company website. When a move consultant sells vendor services, an additional revenue stream for the real estate company can be generated by a fee paid by the vendor company associated with such sales. Sales agents endorse the subject invention because it adds value for their contacts and maintains commission levels. Thus, sales agents garner an advantage over real estate agents who do not have the support of such a unique system.

At step 230, the real estate cycle enters another phase as a real estate transaction occurs. The buyer and seller reach an agreement and a closing date is determined. For example, a contact may be selling and/or purchasing a piece of real estate. Thereupon, the status of the listing and contact are updated within the databases and the system automatically determines commissions and the like. At such a time, a move consultant markets closing related services to the contact such as, for example, utility services, title companies, mortgage brokers, insurance brokers, relocation services and the like.

At step 240, the closing is complete and the real estate cycle enters the next phase in which a move consultant markets post-closing vendors to the contact. By this point, a move consultant has established a relationship with the contact, by having previously offered the services of vendors. Post-close vendors may include painters, landscapers, pool and spa companies, roofers, carpet retailers, tile installers, appliance retailers, refuse disposal services and the like. Once again, cross-selling products generates multiple revenue streams for the real estate company. A first revenue stream derives from vendors buying access to the contact base and a second derives from a commission associated with converted sales.

At step 250, the system and method features open connectivity in order to utilize external tools or applications. Integration with accounting software is particularly useful. For example, in accordance with the subject invention, all commission sales data is written to temporary tables, which are then used during integration with accounting software. Once integrated, accounting software properly pays the agent, manager and external commissions through accounts payable or payroll modules. As a result, net productivity is enhanced.

The subject invention provides for continuing communication with contacts by creating a series of different data tables. These tables are accessed and exported for direct mail merges. After the mail merge jobs have been completed and confirmed, the program marks the contact record and sets the flags within the listings database and sales database to indicate completion of the mailing. The subject invention also contemplates mining the data collected to publish a newsletter which is used as a marketing vehicle for the real estate company.

It is envisioned that a move consultant provides data relating to vendors who provide periodic services as required by contacts and listings. In another embodiment, a contact receives a card with a pin number to obtain discounts from participating national and local vendors. Preferably, the contact receives the card one year after closing a real estate transaction. The combination of the card and newsletter maintaining contact with the real estate company indicates entry into the last phase of the real estate cycle. During the last phase, the ongoing activity helps to insure a high rate of return business from contacts, in effect re-entry of the contact into the first phase of the real estate transaction cycle.

In a preferred embodiment, management monitors transactions and generates customized reports. Corporate and sales offices can create detailed and summary reports. Different reports include, but are not limited to, listing and sale reports, financial reports, agent reports and contact reports. The system calculates commission dollars that are due to the company, along with insuring that all referrals are properly recorded. For example, financial reports show the commission income to the company and the dollars to be paid to the sales agents and external agencies. Trustee accounting is also facilitated by the system. Each deposit or disbursement transaction is associated and made a permanent part of the sale record. Batch processing allows updating the databases on a periodic basis, for example, nightly, to advantageously keep the data current. Thus, a pending sales report accurately predicts future cash flow.

Still referring to step 250, a survey mechanism within the system of the subject invention provides for the recording of responses from Customer Surveys. Management can also generate reports based upon the surveys. The system allows the company to modify and update surveys. In a preferred embodiment, customized forms can be created using OMNI-FORM® 3.0, MICROSOFT WORDS® 97 or ACROBAT® software version 3.0.1 (available from Adobe Systems Incorporated at 1585 Charleston Road, Mountain View, Calif. 94397), as is well known by those skilled in the art.

While the invention has been described with respect to preferred embodiments, those skilled in the art will readily appreciate that various changes and modifications can be made to the invention without departing from the spirit or scope of the invention.

What is claimed is:

1. A method for managing real estate transactions over a distributed computing network comprising the steps of:
   (a) receiving and storing data relating to a plurality of contacts including buyers and sellers of real estate in a contact database, wherein each contact is associated with a real estate agent;
   (b) receiving and storing data relating to a plurality of vendors of real estate related services in a vendor database, wherein each vendor is associated with at least one phase of a real estate transaction;
   (c) accessing data in the vendor database relating to at least one vendor based upon an occurrence of a particular phase of a real estate transaction involving a contact;
   (d) communicating said data relating to said at least one vendor to the contact upon the occurrence of the particular phase of the real estate transaction so as to market real estate related services provided by a vendor to the contact;
   (e) receiving and storing data relating to the services provided by a vendor to the contact in the contact database; and
   (f) providing the real estate agent associated with the contact with access to the contact database over a distributed computing network, so as to enable the real estate agent to monitor the services provided to the contact by a vendor.

2. A method according to claim 1, further comprising the step of determining a commission based upon a sale of vendor service to said contact.

3. A method according to claim 1, further comprising the step of determining a commission based upon the communication of data relating to the vendors to a contact upon occurrence of the particular phase of the real estate transaction.

4. A method according to claim 1, further comprising the step of receiving and storing data relating to a plurality of sales agents.

5. A method according to claim 4, further comprising the step of generating reports relating to activity of said plurality of sales agents.

6. A method according to claim 1, further comprising the step of receiving and storing data relating to real estate listings.

7. A method according to claim 6, further comprising the step of transmitting data relating to said real estate listings to said contact when said contact requests said data.

8. A method according to claim 1, wherein the step of accessing vendor data occurs upon signing of a real estate listing agreement.

9. A method according to claim 1, wherein the step of accessing vendor data occurs upon signing of a buyer agreement.

10. A method according to claim 1, wherein the step of accessing vendor data occurs upon signing of a binder agreement.

11. A method according to claim 1, wherein the step of accessing vendor data occurs upon closing of a contract for a sale of real estate.

12. A method according to claim 1, wherein the step of accessing vendor data occurs within a predetermined time period following a closing date for a real estate contract.

13. A method according to claim 1, wherein the step of accessing vendor data occurs within a predetermined time period preceding a closing date for a real estate contract.

14. A method according to claim 1, further comprising the step of assigning a move consultant to a contact upon the occurrence of a particular phase of the real estate transaction.

15. A method according to claim 14, wherein the steps of accessing and communicating data relating to vendors is conducted by the move consultant.

16. A method according to claim 15, further comprising the step of notifying the move consultant of the occurrence of a particular phase of the real estate transaction.

17. A method according to claim 1, further comprising the step of communicating future maintenance reminders to said contact based upon historical data relating to goods and services provided to the contact by a vendor during the real estate transaction.

18. A method according to claim 1, further comprising the step of issuing an access code to each contact to permit each contact to obtain discounted goods and services provided by the vendors.

19. A method for managing real estate transactions over a distributed computing network comprising the steps of:
   (a) receiving and storing data relating to a plurality of contacts including buyers and sellers of real estate in a contact database, wherein each contact is associated with a real estate agent;
   (b) receiving and storing data relating to a plurality of vendors of real estate related services in a vendor database, wherein each vendor is associated with at least one phase of a real estate transaction;
   (c) assigning a move consultant to each contact to facilitate communication between the contact and at least one of the plurality of vendors upon an occurrence of a particular phase of the real estate transaction involving the contact, wherein the move consultant markets real estate related services to the contact;
   (d) receiving and storing data relating to the services provided by a vendor to the contact in the contact database; and
   (e) providing the real estate agent associated with the contact with access to the contact database over a distributed computing network, so as to enable the real estate agent to monitor the services marketed to the contact by the move consultant.

20. A method according to claim 19, further comprising the step of determining a commission based upon a sale of a vendor service to said contact by said move consultant.

21. A method according to claim 19, further comprising the step of determining a commission based upon the communication of data relating to the vendors to a contact by said move consultant upon the occurrence of the particular phase of the real estate transaction.

22. A method according to claim 19, further comprising the step of receiving and storing data relating to a plurality of real estate agents.

23. A method according to claim 19, further comprising the step of receiving and storing data relating to real estate listings.

24. A method according to claim 19, further comprising the step of accessing data related to at least one vendor upon an occurrence of an event selected from the group consisting of signing a listing agreement, signing a buyer agreement, signing of a binder agreement and closing of a contract for a sale of real estate.

25. A method according to claim 24, further comprising the step of notifying the move consultant of the occurrence of one of said events.

26. A method according to claim 19, further comprising the step of providing the move consultant with access to a database containing information relating to a plurality of contacts.

27. A method according to claim 19, further comprising the step of providing the move consultant with access to a database containing information relating to a plurality of vendors of real estate related goods and services.

28. A method according to claim 19, further comprising the step of communicating future maintenance reminders to said contact based upon historical data relating to goods and services provided to the contact by a vendor during the real estate transaction.

29. A method according to claim 19, further comprising the step of issuing an access card to each contact to permit each contact to obtain discounts on goods and services provided by the vendors.

30. A system for managing real estate transactions over a distributed computing network comprising:
   (a) means for receiving and storing data relating to a plurality of contacts including buyers and sellers of real estate in a contact database, wherein each contact is associated with a real estate agent;
   (b) means for receiving and storing data relating to a plurality of vendors of real estate related services in a vendor database, wherein each vendor is associated with at least one phase of a real estate transaction;
   (c) means for accessing data from the vendor database relating to at least one vendor upon an occurrence of a particular phase of a real estate transaction involving a contact; and
   (d) means for communicating said data relating to said at least one vendor to the contact upon the occurrence of the particular phase of the real estate transaction so as to market real estate related services provided by a vendor to the contact;
   (e) means for receiving and storing data relating to the services provided by a vendor to the contact in the contact database; and
   (f) means for providing the real estate agent associated with the contact with access to the contact database over a distributed computing network, so as to enable the real estate agent to monitor the services provided to the contact by a vendor.

31. A system as recited in claim 30, further comprising means for determining a commission based upon a sale of a vendor service to said contact.

32. A system according to claim 30, further comprising means for generating reports based upon the determination of commissions.

33. A system as recited in claim 30, further comprising means for receiving, storing and presenting text and graphics relating to real estate listings.

34. A system as recited in claim 33, further comprising means for transmitting said text and graphics to said contact when said contact requests said text and graphics via Internet communications.

35. A system as recited in claim 30, further comprising means for analyzing surveys received from said contacts relating to performance of a real estate company and employees thereof during a real estate transaction.

36. A method according to claim 30, further comprising means for communicating future maintenance reminders to said contact based upon historical data relating to goods and services provided to the contact by a vendor during the real estate transaction.

37. A system as recited in claim 30, further comprising means to permit each contact to obtain discounted goods and services provided by the vendors.

38. A method of cross-selling real estate related goods and services during various phases of a real estate transaction cycle, comprising the steps of:
   a) receiving and storing data relating to a plurality of contacts including buyers and sellers of real estate in a contact database, wherein each contact is associated with a real estate agent;
   b) receiving and storing data relating to a plurality of vendors of real estate related goods and services in a plurality of vendor databases, wherein each vendor is associated with at least one phase of a real estate transaction cycle;
   c) accessing a first data set from a vendor database relating to at least one vendor based upon the execution of an agent agreement by a contact commencing a first phase of the real estate transaction cycle, and communicating the first data set to the contact based upon data in the contact database to facilitate a sale of preparatory goods and services to the contact during the first phase of the real estate transaction cycle;
   d) accessing a second data set from a vendor database relating to at least one vendor based upon the execution of a binder agreement by the contact commencing a second phase of the real estate transaction cycle, and communicating the second data set to the contact based upon data in the contacts database to facilitate a sale of closing related goods and services to the contact during the second phase of the real estate transaction cycle;
   e) accessing a third data set from a vendor database relating to at least one vendor based upon the execution of a contract for a sale of real estate by the contact commencing a third phase of the real estate transaction cycle, and communicating the third data set to the contact based upon data in the contacts database to facilitate a sale of postclosing related goods and services to the contact during the third phase of the real estate transaction cycle;
   f) receiving and storing data in the contact database that relates to the goods and services provided by vendors to the contact; and
   g) providing the real estate agent associated with the contact with access to the contact database over a distributed computing network, so as to enable the real estate agent to monitor the goods and services provided to the contact by vendors throughout each phase of the real estate transaction cycle.

39. A method according to claim 38, further comprising the step of assigning a move consultant to a contact in the contact database, the move consultant accessing data from the vendor databases during each phase of the real estate transaction cycle for each assigned contact.

40. A method according to claim 38, further comprising the step of determining a commission based upon a sale to a contact during any phase of the real estate transaction cycle.

41. A method of cross-selling real estate related goods and services during various phases of a real estate transaction cycle, comprising the steps of:
   a) receiving and storing data relating to a plurality of contacts including buyers and sellers of real estate in a contact database containing a plurality of contact records, each contact record containing information corresponding to a particular contact, wherein each contact is associated with a real estate agent;
   b) receiving and storing data relating to a plurality of vendors of real estate related goods and services in a plurality of vendor databases, each vendor database corresponding to a particular type of good or service and containing a plurality of vendor records, each vendor record containing information corresponding to a particular vendor, each vendor being associated with a particular phase of a real estate transaction cycle;
   c) accessing a first vendor record based upon the execution of an agent agreement by a contact commencing a first phase of the real estate transaction cycle, and communicating information stored in the first vendor record to the contact based upon information stored in a contact record to facilitate a sale of preparatory goods and services to the contact by the first vendor during the first phase of the real estate transaction cycle;
   d) accessing a second vendor record based upon the execution of a binder agreement by the contact commencing a second phase of the real estate transaction cycle, and communicating information stored in the second vendor record to the contact based upon information stored in the contact record to facilitate a sale of closing related goods and services to the contact by the second vendor during the second phase of the real estate transaction cycle;
   e) accessing a third vendor record based upon the execution of a contract for a sale of real estate by the contact commencing a third phase of the real estate transaction cycle, and communicating information stored in the third vendor record to the contact based upon information stored in the contact record to facilitate a sale of postclosing related goods and services to the contact by the third vendor during the third phase of the real estate transaction cycle;
   f) receiving and storing data in the contact's record that relates to the goods and services provided by vendors to the contact; and
   g) providing the real estate agent associated with the contact with access to the contact's record over a distributed computing network, so as to enable the real estate agent to monitor the goods and services provided to the contact by vendors throughout each phase of the real estate transaction cycle.

42. A method according to claim 41, further comprising the step of assigning a move consultant to a contact in the contact database, the move consultant accessing at least one vendor record during each phase of the real estate transaction cycle for each assigned contact.

43. A method according to claim 41, further comprising the step of determining a commission based upon a sale by a vendor to a contact during any phase of the real estate transaction cycle.

44. A method according to claim 1, further comprising the step of providing the contact with access to the contact database over a distributed computing network, so as to enable the contact to monitor the services provided by the vendor.

45. A method according to claim 19, further comprising the step of providing the contact with access to the contact database over a distributed computing network, so as to enable the contact to monitor the services marketed by the move consultant.

46. A method for managing real estate transactions over a distributed computing network comprising the steps of:
 a) receiving and storing data relating to a plurality of contacts including buyers and sellers of real estate in a contact database, wherein each contact is associated with a real estate agent;
 b) receiving and storing data relating to a plurality of vendors of real estate related services in a vendor database, wherein each vendor is associated with at least one phase of a real estate transaction;
 c) assigning a move consultant to each contact to market real estate related services to the contact at each stage of a real estate transaction involving the contact;
 d) receiving and storing data relating to the services provided by a vendor to the contact in the contact database; and
 e) providing the real estate agent associated with the contact with access to the contact database over a distributed computing network, so as to enable the real estate agent to monitor the services marketed to the contact by the move consultant.

47. A method according to claim 46, further comprising the step of providing the contact with access to the contact database over a distributed computing network, so as to enable the contact to monitor the services marketed by the move consultant.

* * * * *